United States Patent
Van Heteren (10) Patent No.: US 7,230,544 B2
(45) Date of Patent: Jun. 12, 2007

(54) INTELLIGENT TWO-WAY TELEMETRY

(75) Inventor: John Gerald Van Heteren, Foster City, CA (US)

(73) Assignee: Cellnet Innovations, Inc., Alpharetta, GA (US)

( * ) Notice: Subject to any disclaimer, the term of this patent is extended or adjusted under 35 U.S.C. 154(b) by 0 days.

(21) Appl. No.: 11/287,748

(22) Filed: Nov. 28, 2005

(65) Prior Publication Data

US 2006/0111796 A1    May 25, 2006

Related U.S. Application Data

(63) Continuation of application No. 10/128,928, filed on Apr. 22, 2002, now abandoned.

(51) Int. Cl.
*G08B 22/00* (2006.01)
(52) U.S. Cl. .................. 340/870.03; 705/412; 700/295; 340/870.02; 340/870.06
(58) Field of Classification Search ........... 340/870.02, 340/870.03, 870.06, 635; 705/412; 324/103 R; 700/295
See application file for complete search history.

(56) References Cited

U.S. PATENT DOCUMENTS

| | | | |
|---|---|---|---|
| 5,432,507 A | * | 7/1995 | Mussino et al. ....... 340/870.03 |
| 5,448,230 A | * | 9/1995 | Schanker et al. ...... 340/870.03 |
| 5,717,718 A | * | 2/1998 | Rowsell et al. ............. 375/260 |
| 5,719,564 A | * | 2/1998 | Sears .................... 340/870.02 |
| 5,892,758 A | * | 4/1999 | Argyroudis ................. 370/335 |
| 5,923,269 A | * | 7/1999 | Shuey et al. ........... 340/870.02 |
| 5,933,092 A | * | 8/1999 | Ouellette et al. ....... 340/870.02 |
| 5,959,549 A | * | 9/1999 | Synesiou et al. ....... 340/870.02 |
| 6,100,817 A | * | 8/2000 | Mason et al. .......... 340/870.02 |
| 6,124,806 A | * | 9/2000 | Cunningham et al. . 340/870.02 |
| 6,195,018 B1 | | 2/2001 | Ragle et al. |
| 6,366,217 B1 | * | 4/2002 | Cunningham et al. . 340/870.31 |

* cited by examiner

Primary Examiner—Albert K. Wong
(74) Attorney, Agent, or Firm—Kilpatrick Stockton LLP (57) ABSTRACT

Methods and apparatus, including computer program products, implementing and using techniques for intelligent two-way telemetry. A telemetry system in accordance with the invention includes one or more telemetry units that can receive and send data. The system further includes one or more controllers that includes intelligence for processing data from the one or more telemetry units and for autonomously communicating with the one or more telemetry units. The controllers are separately located from a data processing center of the telemetry system such that the controllers alleviate data congestion going to and coming from the data processing center.

23 Claims, 7 Drawing Sheets

INTELLIGENT TWO-WAY TELEMETRY

CROSS-REFERENCE TO RELATED APPLICATIONS

The present application is a continuation of application Ser. No. 10/128,928 filed Apr. 22, 2002, now abandoned.

BACKGROUND OF THE INVENTION

The present invention relates to telemetry.

One application of telemetry is the collection of data from a metering system, which is a system that periodically measures one or more parameters at multiple locations. Utility companies meter, e.g., the amount of natural gas, electricity, and water consumed by households.

The collection of data from a metering system can be performed by physically inspecting of individual meters. For example, in residential areas, electrical utility companies use electromechanical meters with rotating disks to measure the consumption of electricity. Electrical utility companies send a person, sometimes referred to as a meter reader, to record the meter measurement about once a month. Metering of natural gas and water is performed similarly.

Alternatively, a metering system can have multiple sensors that transmit meter data, such as measured parameters, from multiple locations to multiple collection devices. There are usually fewer collection devices than sensors. Transmissions from a sensor to a collection device are used to collect meter data. The collection devices can be positioned such that transmissions from a single sensor are received by one or more one collection devices. In response to the transmissions received from multiple sensors, the multiple collection devices transmit data to a central monitoring station. The described telemetry eviscerates the need for a person such as a meter reader to manually record meter measurements.

Conventional telemetry systems often adopt a many-to-one approach to telemetry communications. Specifically, a conventional telemetry system consists of a plurality of telemetry units ("TU" or "TUs"), such as the described sensors, that send their data primarily to one data processing center, such as the described central monitoring station. At times, the data processing center needs to initiate communications to an individual telemetry unit or to all telemetry units in its system. For example, the central monitoring station may need to reset a sensor's demand register value in a certain electricity meter. Similarly, the central monitoring station may need to set or change a time-of-use configuration in all meters of a certain class. Or more generally, the processing center may need to recover data, such as load profile data or demand data, lost during previous communication attempts by a telemetry unit.

Figure 1:
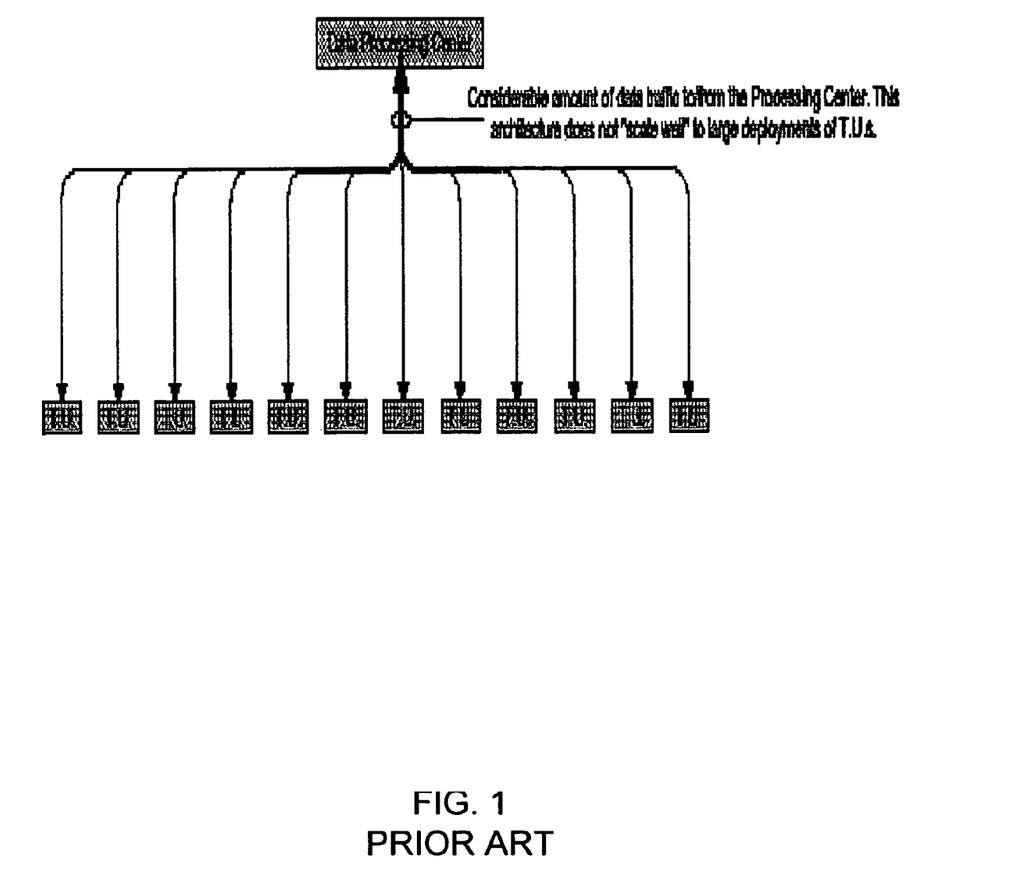
FIG. 1 shows a conventional telemetry system.

Conventional telemetry systems usually adopt a dumb-pipe approach to the initiation of communications with a telemetry unit or group of telemetry units by a data processing center. In such systems, software at the data processing center sends commands through the dumb pipe, directly to the telemetry units for processing. See, for example, the conventional system shown in FIG. 1. The telemetry units respond to the data processing center's commands with data and acknowledgements sent through the dumb pipe.

SUMMARY OF THE INVENTION

The present invention provides methods and apparatus, including computer program products, for providing two-way telemetry with a distributed intelligence.

In general, in one aspect, a telemetry system in accordance with the invention includes one or more telemetry units that can receive and send data. The system further includes one or more controllers that includes intelligence for processing data from the one or more telemetry units and for autonomously communicating with the one or more telemetry units. The controllers are separately located from a data processing center of the telemetry system. The controllers alleviate data congestion going to and coming from the data processing center.

In general, in another aspect, a computer program product, in accordance with the invention, for reducing traffic congestion between a data processing center and end points in a metering system includes instructions to cause a controller to receive telemetry from one or more end points, the telemetry including a measure of utility consumption. The product includes instructions to cause controller to receive utility pricing data and a user preference. The product includes instructions to cause controller to autonomously control a device at an end point in accordance with the user preference and based on the utility data received and the telemetry received. The product is tangibly stored on machine readable medium.

The invention can be implemented to realize one or more of the following advantages. In a system where there are a large number of telemetry units, the message traffic burden at the data processing center is so large that communication links, even those that have large capacities, become a bottle neck. An uneconomical amount of computer power is required to handle that amount of communication information at one time. A system in accordance with the invention provides a simple, efficient, and economical approach to the initiation of communications by the data processing center. The system reduces bottlenecks of traffic coming to and going from the data processing center. The system can support a high ratio of telemetry units to data processing centers and is applicable to systems, such as automatic meter reading ("AMR") systems, that often have ratios of telemetry unit to data processing center that are between 100,000:1 and 2,000,000:1.

The system minimizes network capital and operating costs by performing a number of common decision-making tasks at controllers that include intelligence. In one implementation, the system includes controllers between a wide area network ("WAN") and a local area network ("LAN"). The system need not use an expensive and complex LAN but can support an inexpensive and simple LAN such as the unlicensed wireless 902-928 MHz ISM band. (Most inexpensive LANs have a limited data rate throughput.) The system can similarly support an inexpensive and simple WAN such as the 25 kHz wide licensed MAS bands at 952 MHz. (Most inexpensive and ubiquitous WANs have a limited data rate throughput.)

The system allows one to include inexpensive endpoint units such as those with relatively little memory, processing, and communication capabilities. The endpoint units can include one or more devices, e.g., a thermostat, that the controller can control. The controllers include intelligence that allows them to make decisions based on a comparison of some recent measurement, e.g., kilowatt-hour usage and temperature, against a slowly evolving database, e.g., hourly pricing of power that is updated daily.

The system keeps high-risk traffic volume contained in small network or geographic segments. In one implementation, the wireless communication link between a telemetry unit and a controller is an unlicensed band that is more susceptible to interference than the licensed wireless link between the controller and a data processing center (though the wireless link of the controller and the data processing center has its own handshaking traffic, the number of controller-to-data processing center retries is minimal because the licensed band is totally within the system's control; additionally the data processing center has a landline link to a system controller). The link of the telemetry unit and the controller has the highest risk of failing and, hence, the highest level of retries and handshaking traffic. By confining this high-risk traffic to only the controller-telemetry unit level, the system further avoids the bogging-down of the link between the controller and a data processing center with unnecessary traffic.

The details of one or more embodiments of the invention are set forth in the accompanying drawings and the description below. Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 2:
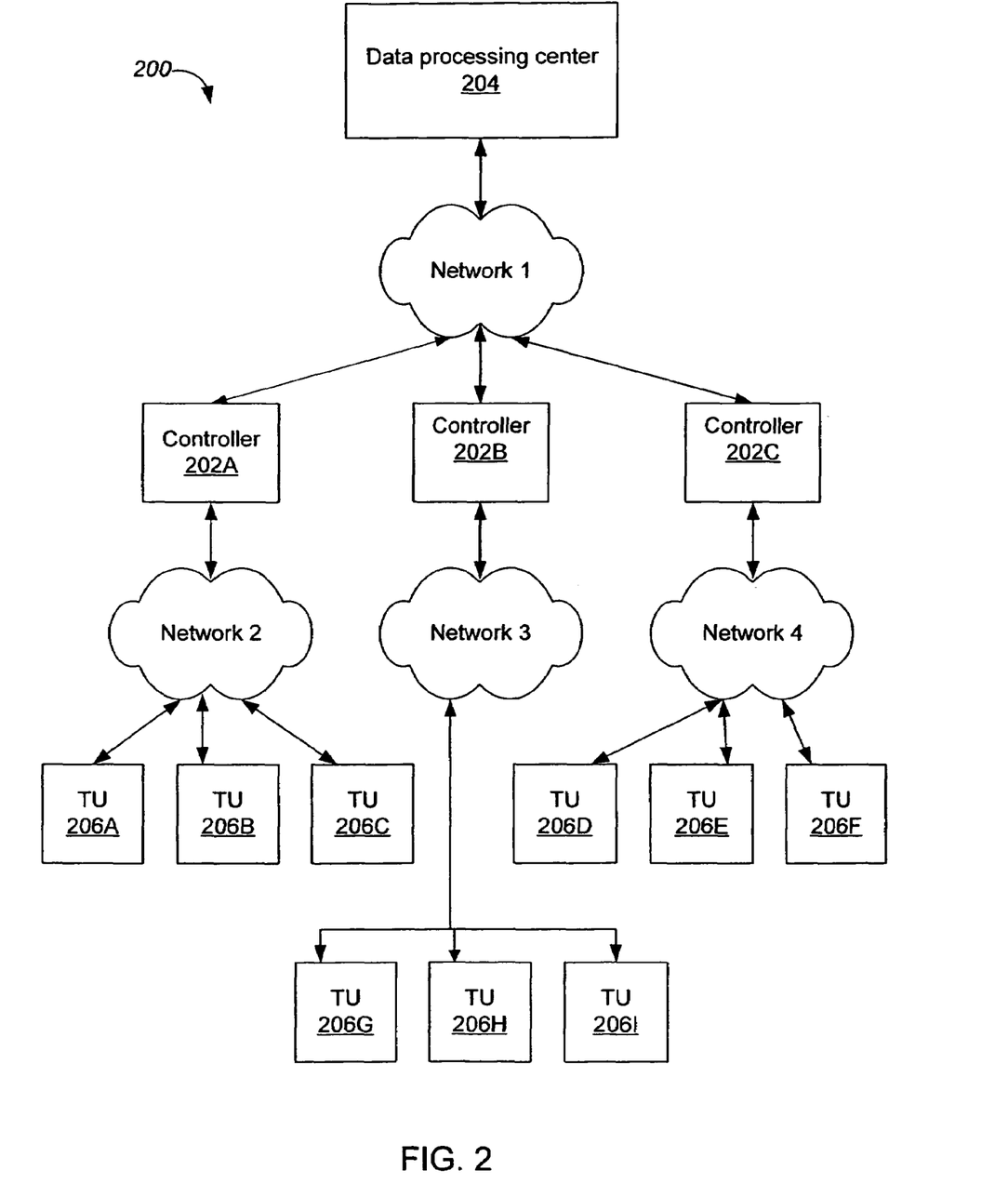
FIG. 2 shows a telemetry system in accordance with the invention.

As shown in FIG. 2, a system 200 in accordance with the invention includes one or more MicroCell controllers ("controllers" or "controller") such as controllers 202A-C (collectively referred to as controllers 202), a data processing center 204, and one or more telemetry units such as telemetry units 206A-I (collectively referred to as telemetry units 206). The data processing center 204 as well as the controllers 202 include intelligence. In contrast to conventional telemetry systems, where only a data processing center is used to communicate with the telemetry units, the system 200 can use either its controllers 202, the data processing center 204, or both its controllers 202 and the data processing center 204 to communicate and interact with the telemetry units 206.

Because each controller of the system 200 includes its own intelligence and does not rely on the intelligence of the data processing center 204, each controller can perform various functions traditionally performed by a data processing center. These functions include but are not limited to data collection, control of devices such as a utility meter, and traffic message processing and routing. Because a controller includes intelligence, some communications with a telemetry unit need not be conveyed to the data processing center 204. Consequently, the controllers alleviate message traffic congestion.

The described system can be used in a variety of applications, such as metering of utilities, manufacturing control, traffic monitoring, and meteorological data gathering. An example of a metering system is described in U.S. Pat. No. 6,195,018 to Ragle et al, filed on Feb. 27, 2001, entitled "Metering System", and assigned to the assignee of the present application, the entire contents of which are incorporated in to this application by reference. Another example is described in the U.S. application Ser. No. 10/122,471, filed on Apr. 12, 2002, entitled "Data Collection and Metering System", and assigned to the assignee of the present application, the entire contents of which are incorporated in to this application by reference.

In one implementation controllers are mounted on a pole such as a utility pole. The controller, instead of the data processing center, makes communication and control decisions. In a sense, the system includes a Supervisory Control and Data Acquisition ("SCADA") system that has distributed intelligence.

Figure 3:
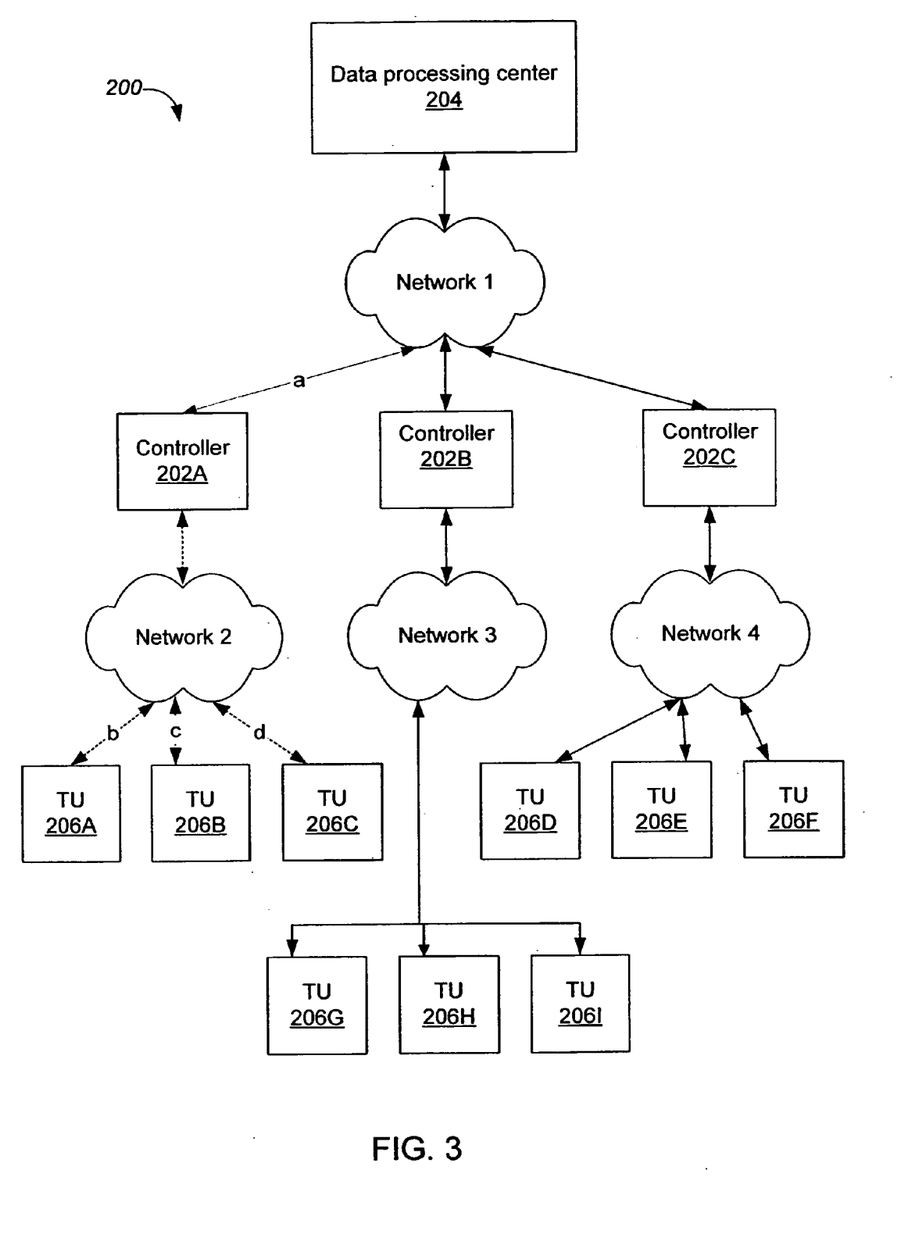
FIG. 3 illustrates an example where the controllers of the system process and route traffic messages.

FIG. 3 illustrates an example where a controller of the system 200 processes and routes traffic messages. As shown, the controller 202A expands a message, e.g., message "a," sent from the data processing center 204 into one or more separate messages, e.g., messages "b," "c," and "d." The controller sends each of the one or more separate messages to the respective telemetry units, telemetry units 206A-C. The data processing center 204 need not communicate directly with each of the telemetry units 206A-C to which the messages are addressed. Thus, in contrast to conventional systems, the system 200 prevents any traffic bottlenecks from occurring at the data processing center.

Figure 4:
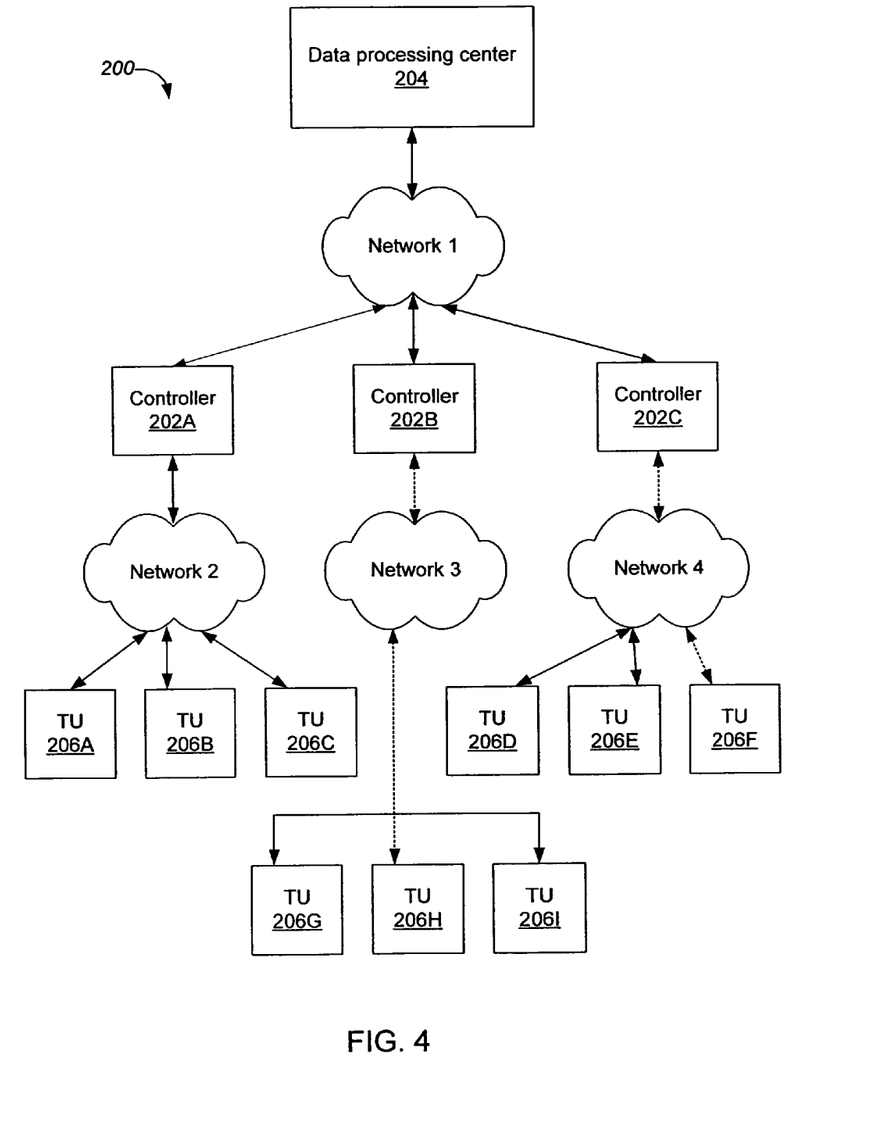
FIG. 4 illustrates an example where the controllers of the system autonomously communicate with telemetry units FIG. 5. shows a method for controlling a smart thermostat.

FIG. 4 illustrates an example where the controllers of system 200 autonomously communicate with telemetry units. As shown, controllers 202B and 202C (as opposed to the data processing center 204) autonomously handles all the communication with telemetry units 206H and 206F, respectively to, e.g., gather missing data or data unable to be retrieved during previous communications attempts. The controllers 202B and 202C thus relieve the traffic burden at the data processing center 204.

The following illustrates an example where the controllers of the system 200 adjusts a thermostat in a household according to hourly energy pricing tables. In this example, consumers, including homeowners and businesses, have an option of dynamic pricing. That is, power costs more when there is less supply. For example, during the summer, electrical power will cost more at 4:00 PM, when all the air conditioners are on, than at 4:00 AM, when very few appliances are on. A utility company such as a distribution utility, has pre-arranged power contracts with energy generators to have more power available at 4:00 PM than at 4:00 AM. However, this type of arrangement is not flexible enough to handle spikes in demand such as a sharp increase in demand during a heat wave. During an extended heat wave, the distribution utility must purchase power on the spot market. Prices on the day-ahead and hourly spot markets range from a baseline of $20 to $40 per megawatt-hour to spikes as high as $800 per megawatt-hour. In a deregulated environment, the distribution utility can pass these costs on to the consumer who will see the cost of electricity jump from about $0.10/kWh to $6.00/kWh.

With only 24 hours advance notice for these price spikes, a consumer often lacks sufficient time to raise thermostat setting and consume less power to avoid the spike in cost. A smart thermostat can adjust its setting to avoid a price spike. Some of these devices can be connected to the Internet. However, such use of the Internet requires that the homeowner get an Internet account to manage their energy consumption. To date, the distribution utilities have not been responsible for ensuring that their customers have working Internet accounts, but they have been responsible for ensuring that all their customers have equal access to services, including any dynamic pricing service.

One cost-effective way to enable equal access to dynamic pricing or load control services is to have a telemetry unit such as a wireless transceiver connected to the smart thermostat in each house or facility. The hardware and operating costs for maintaining a network of low data-rate wireless transceivers is much less than the costs of providing Internet service to the same population. The consumer can configure the smart thermostat according to pricing signals and, thus, avoid spikes in energy cost. Such a pricing configuration can be maintained at the smart thermostat. Alternatively, the consumer's pricing configuration can be maintained at a controller.

The consumer can have a variety of ways of setting a pricing configuration. One way is to specifying a maximum price. For example, the consumer can specify that she would like to keep her house at 72 degrees Fahrenheit, that $24 per day is the most she is willing to pay to do so, and that in no case does she want the temperature in her house to exceed 84 degrees Fahrenheit. Another way for the consumer to set a pricing configuration is to specify the maximum temperature that she will tolerate as the price of energy rises. Table 1 provides an example of this way of specifying the pricing configuration.

TABLE 1

| | |
|---|---|
| Price < $0.40/kWh: | Thermostat at 72 degrees F. |
| $0.40/kWh < Price < $0.80/kWh: | Thermostat air conditioning to 74 degrees F. |
| $0.80/kWh < Price < $1.80/kWh: | Thermostat air conditioning to 76 degrees F. |
| $1.80/kWh < Price < $3.80/kWh: | Thermostat air conditioning to 78 degrees F. |
| $3.80/kWh < Price: | Thermostat air conditioning to 82 degrees F. |

To provide equal access, these specifications can be entered at the smart thermostat and be transmitted to the controller over a network such as a wireless LAN. Alternatively, for consumers who does not want to navigate menu trees on a small display of a smart-thermostat and who have Internet access, the pricing configuration can be entered through a Website, e.g., one maintained by the utility. In this case, the pricing configuration will be transmitted over a network, such as a WAN, to the controller. The consumer pricing configuration are stored and used at the controller, and backup copies are optionally maintained at a data processing center. Because these pricing configuration do not often change, the traffic volume does not overburden the WAN.

Each homeowner can have his or her own thresholds. That is, each homeowner can specify how much they are willing to pay to keep cool. Because the hour-by-hour price tables change on a daily basis, the thermostat must interact with a constantly evolving database. By maintaining these tables at the controllers and providing the intelligence for the controllers to autonomously communicate this information to the smart thermostats, the controllers can provide this information to the smart thermostats at the households without burdening the WAN. Thus, the data processing center need not be involved in such operations and, consequently, traffic for such operations need not pass through the data processing center. A WAN supporting communications to and from the data processing center, e.g., would not be burdened with traffic associated with millions of houses accessing the same pricing tables at the same time. Furthermore, by including the intelligence, i.e., the changing price tables in the controllers, the price tables need not be included in the smart thermostats or wireless transceivers. Hence, the smart thermostats and wireless transceivers can be simple and low-cost because they need less memory and processing power.

In this example, the household thermostat, through an attached telemetry unit, is in 2-way communication with a controller that includes updated hourly pricing tables. The controller receives updates to its price tables from a data processing center. Alternatively, the controller can receive updates to its pricing table from any other source. There can be several pricing tables, each one showing the price per unit of energy available from each energy provider. The controller uses these pricing tables to control the smart thermostats in accordance with the consumer's pricing configuration.

Figure 5:
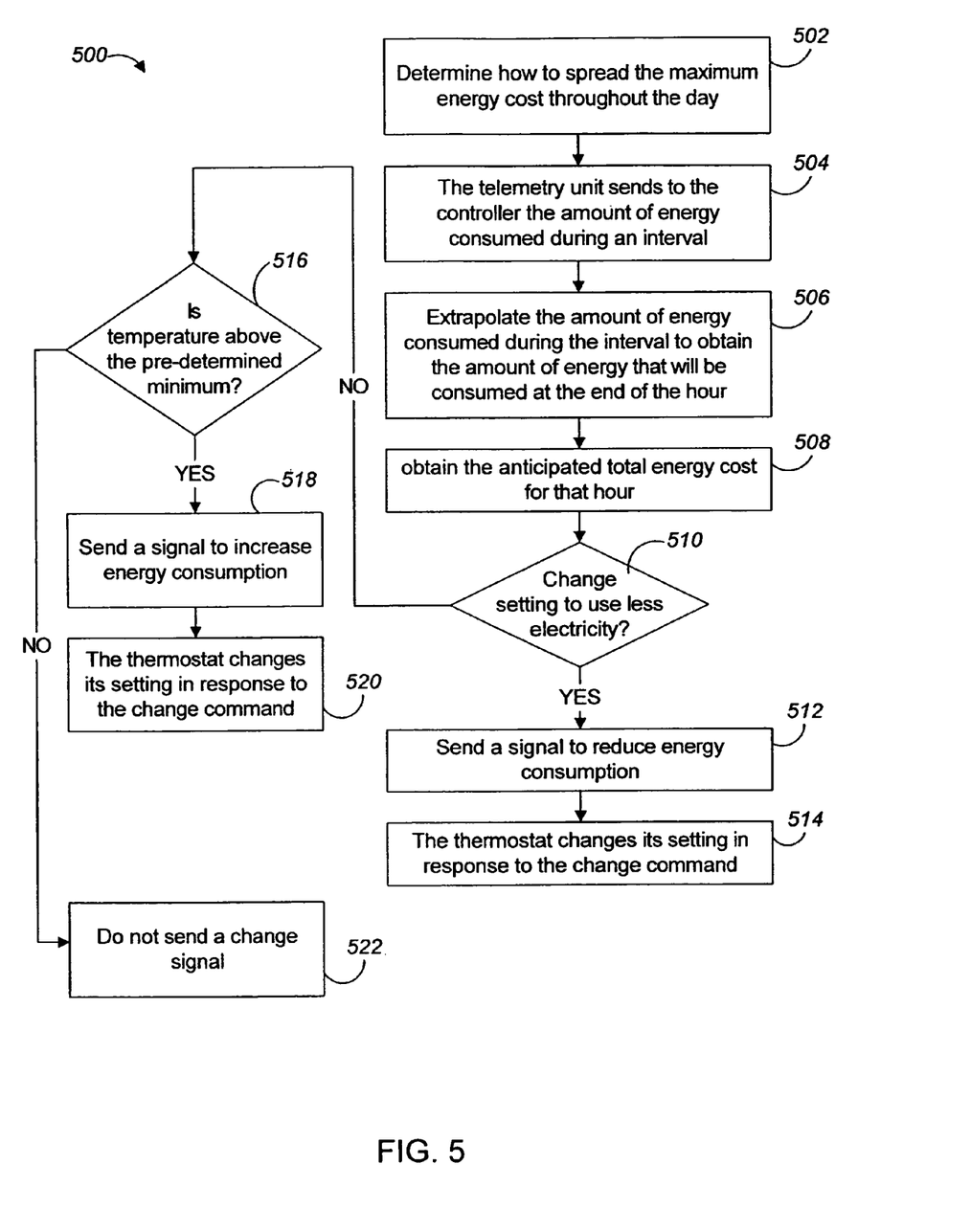

FIG. 5 illustrates a method 500 for controlling smart thermostats when a consumer sets a pricing configuration by specifying the maximum energy cost per day. Some intelligence, such as a software agent on-board the controller, has already determined how to spread the maximum energy cost throughout the day (step 502). As shown in Table 2, such a determination can be made, e.g., by basing the consumption on the typical hourly temperature profile.

TABLE 2

| Hour range | # of hours | $/ hour | Total $ |
|---|---|---|---|
| 01:00–09:00 | 8 | $0.25 | $2 |
| 09:00–13:00 | 4 | $0.75 | $3 |
| 13:00–21:00 | 8 | $2.00 | $16 |
| 21:00–01:00 | 4 | $0.75 | $3 |
| total | 24 hr | | $24 |

The telemetry unit sends to the controller the amount of energy consumed during an interval (step 504). The interval can be, e.g., every five minutes. An agent at the controller uses this information to determine whether to change the smart thermostat's setting. One way of making such as determination is for the agent to linearly extrapolate the amount of energy consumed during the interval to obtain the amount of energy that will be consumed at the end of the hour (step 506). The agent multiplies this extrapolated amount of energy with the corresponding hourly price to obtain the anticipated total energy cost for that hour (step 508). The agent compares the anticipated cost for that hour to the planned cost per hour specified in the third column of Table 2 to determine whether the thermostat's setting should be changed to consume less electricity (decision step 510). If the anticipated energy cost as calculated in steps 506 and 508 exceeds the amount allotted for that hour as specified by Table 2 (i.e., the pre-determined amount), then the agent causes the controller to change the smart thermostat's setting by sending a signal to the smart thermostat to reduce energy consumption (step 512). Such a signal can be, for example, one that increases the house's temperature on a hot day, but not above the pre-set maximum such as the mentioned 84° F. (step 512). In response to receiving the command from the controller, the smart thermostat changes its setting (step 514). If the anticipated energy cost does not exceed the pre-determined amount for that hour, then the agent determines if the temperature is above the pre-set minimum such as the mentioned 72° F. (step 516). If it is, then the agent causes the controller to change the smart thermostat's setting by sending a signal to the smart thermostat to increase energy consumption (step 518). Such as signal can be, e.g., one that lowers the house's temperature on a hot day (step 518). In response to receiving the command from the controller, the smart thermostat changes its setting (step 520). If the house's temperature is not above the pre-set minimum such as the mentioned 72° F., then the agent does not cause the controller to change the smart thermostat's setting (step 522). Alternatively, the agent can use any other logic to determine whether to change the smart thermostat's setting. The agent is not limited to using the described logic.

Figure 6:
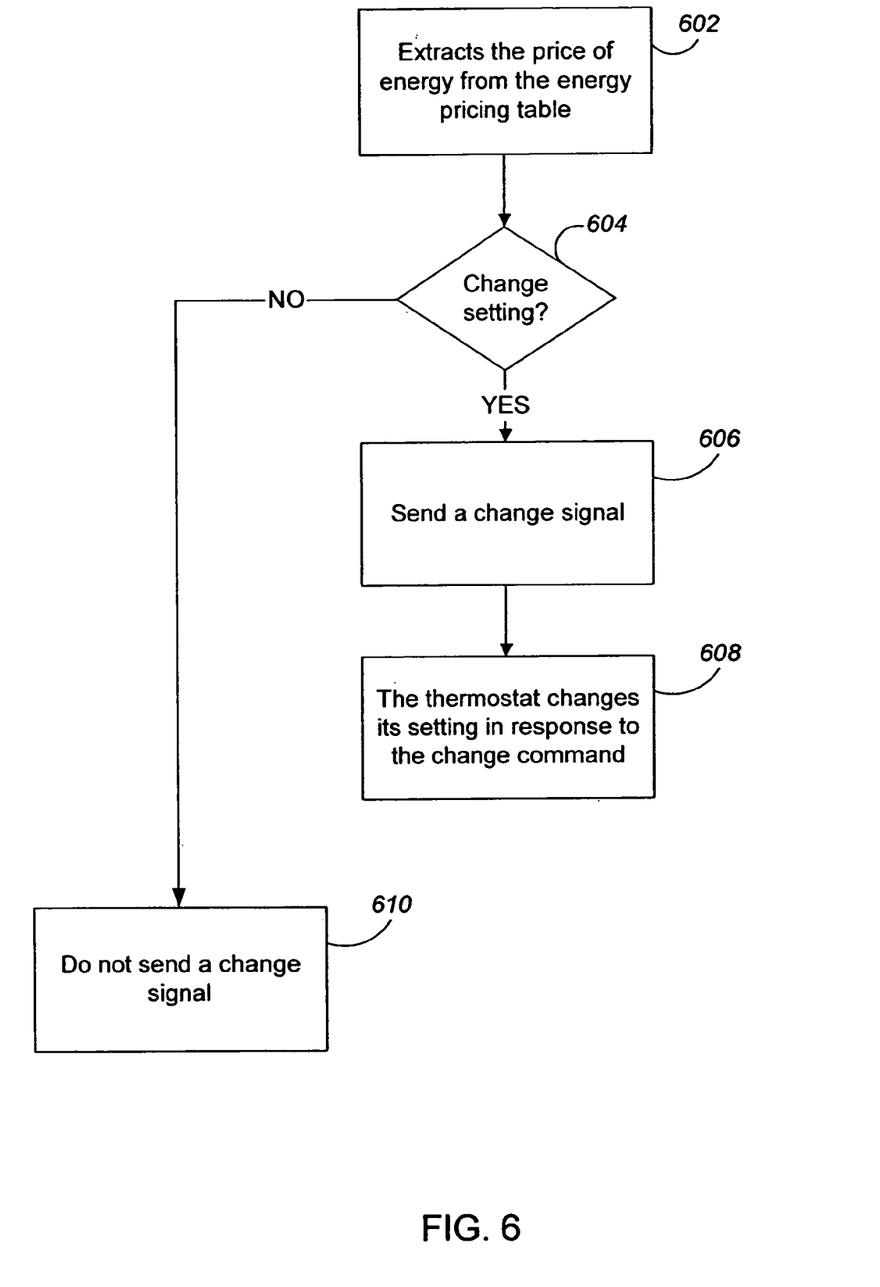
FIG. 6. shows another method for controlling a smart thermostat.

FIG. 6 shows a method for controlling the smart thermostats when the consumer sets a pricing configuration by specifying a maximum temperature for each price point. (Such a pricing configuration is shown above in Table 1.)

As shown in FIG. 6, the agent in the controller extracts, on an hour-by-hour basis, the price of energy for that hour from the hourly energy pricing table (step 602). The agent refers to a table such as Table 1 and examines each consumer's pricing thresholds to decide whether the thermostat in that house should be changed (step 604). If the energy price has changed such that the energy price falls within a new cost bracket, then the controller sends a signal to the smart thermostat to change its setting to the new value (step 606). In response to receiving the command from the controller, the smart thermostat changes its setting (step 608). If the energy price does not change or if the energy price has changed such that the energy price stays in the same price bracket as previous, then the controller does not send a signal to the smart thermostat to change its setting to the new value (step 610).

Optionally, the controller keeps a record of which change was made or records of the statistics of changes so that the utilities can learn the price-points that consumers use. Optionally, the controller includes pricing tables of a variety of power providers. The controller knows which household (i.e., system endpoints) subscribes to which power provider and, accordingly, selects the appropriate pricing table to use.

The following illustrates an example where the controllers of the system 200 sends commands for curtailing power consumption. Like the previous example, a deregulated power market exists here. However, it is the distribution utility, power generation utility, or both that sends out a curtailment command to the households. The utilities sends a curtailment command when the utility decides that the spot market price is too high or it discovers that regardless of price, the power just is not available such as when there are not enough power generators or when transmission lines are at full capacity. In these cases, the utilities need to avoid rolling blackouts by reducing the power consumed. The utilities reduces the power being consumed by adjusting the thermostats of a large number of residential consumers. In some cases, e.g., rolling blackouts can be avoided by setting air conditioner thermostats in only half the homes from 72° F. to 74° F.

Figure 7:
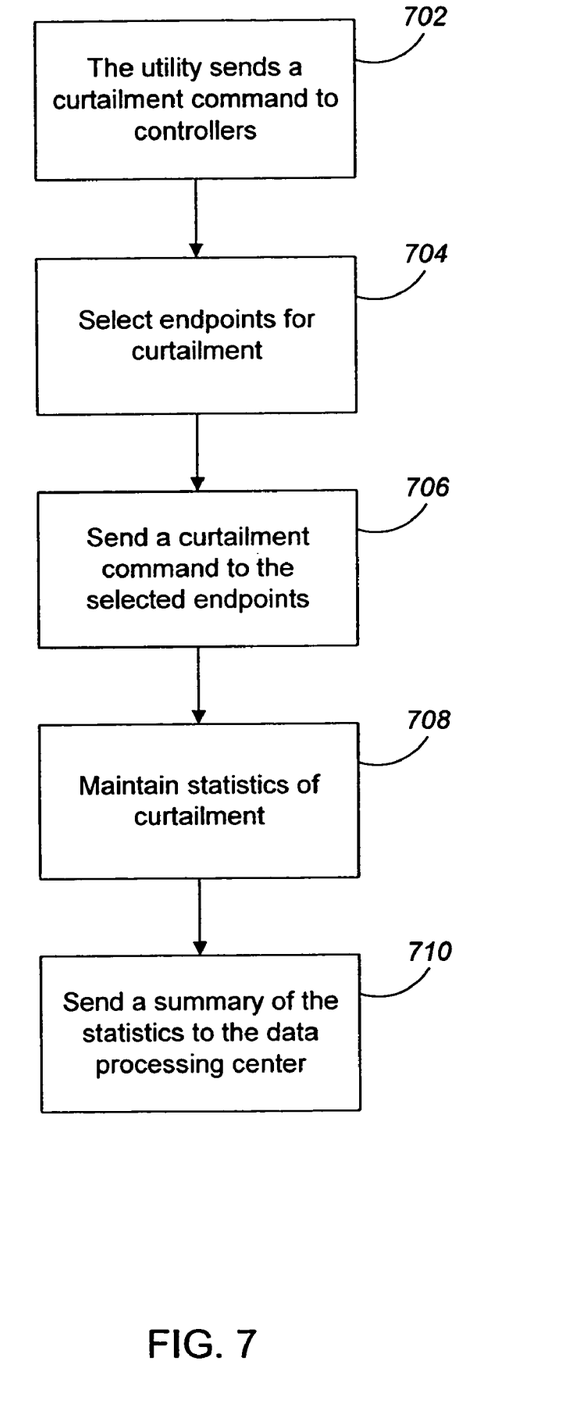
FIG. 7 shows a method of curtailment.

As shown in FIG. 7, a utility sends a curtailment command to a wireless network operator who passes the curtailment command on to several thousand controllers (step 702). Alternatively, the utility can send a curtailment command to the controllers using any communication link or network. Software agents in these controllers determine which endpoint, i.e., household of a customer, should receive the curtailment command (step 704). The determination is based on information specifying the service which a customer has purchased. The information can be stored in a database located at the controller. Customers who did not enrolled in a service that supports curtailment will not receive the curtailment command. The controller sends the curtailment command to the endpoint it determines should receive such a command (step 706). The controller autonomously manages the 2-way communication to the endpoints that it has chosen. The controller maintains statistics of the number of customers that have accepted the curtailment command and the number that have over-ridden it (step 708). The controller needs to send only the summary statistics immediately back to the utility in order for the utility to determine whether its load curtailment command was enough to avoid rolling blackouts (step 710).

Optionally, there are various levels of curtailment. If the response of the first curtailment command does not meet a pre-defined quota, then the controller can autonomously issue a higher level of curtailment to those houses which accepted the first level. In this way the quota will eventually be met, and those houses which participate in the program will correspondingly be rewarded, e.g., with rebates, on their subsequent monthly bill. The autonomous decision-making on the controller avoids burdening a network, such as a wide area network, that supports communication to and from the data processing center. Hence, the controller's ability to autonomously make decisions preserves the low cost of the system and, furthermore, provides fast summaries to the utility. It is usually easier for the data processing center to manage several thousand summaries instead of one million individual compliance results.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

The invention has been described in terms of particular embodiments. Other embodiments are within the scope of the following claims. For example, the steps of the invention can be performed in a different order and still achieve desirable results. The applicability of the telemetry system according to the present invention is not limited to metering but, rather, can be used in any application involving data collection such as manufacturing control, traffic monitoring, and meteorological data gathering.

What is claimed is:

1. A telemetry system, comprising:
   a data processing center;
   telemetry units located at end points of the system and capable of receiving and sending data;
   end point devices located at end points of the system and capable of adjusting utility consumption at the end point; and
   controllers located separate from the data processing center and end points and capable of communication with the data processing center and telemetry units, wherein at least some of the controllers include intelligence for:
   (a) receiving telemetry data from the telemetry units, wherein the telemetry data includes a measure of utility consumption at the end point;
   (b) receiving from the data processing center additional information and storing the additional information;
   (c) making a decision using the telemetry data and the additional stored information; and
   (d) sending one or more communications to one or more of the end point devices to control consumption in accordance with the decision.

2. The system of claim 1, wherein:
   the decision includes a selection of end points; and
   the one or more communications are sent to control the selected end paint devices in accordance with the decision.

3. The system of claim 2, wherein:
   one or more of the end point devices includes a smart thermostat.

4. The system of claim 2, wherein:
   the one or more communications each include a curtailment command.

5. The system of claim 1, wherein:
   the additional stored information is pricing information tat is periodically updated at the controller when pricing information is received from the data processing center.

6. The system of claim 5, wherein:
   the pricing information received from the data processing center includes utility pricing tables;
   the decision determines whether to adjust a setting of one of the end point devices; and
   one or more of the communications includes a command that adjusts the setting of the end point device.

7. The system of claim 1, wherein:
   the controllers further include intelligence for processing the telemetry data received from the telemetry devices and sending the processed data to the data processing center.

8. The system of claim 1, wherein:
   the one or more controllers includes intelligence for generating separate messages from a single message from the data processing center, each separate message being sent to one of the end points.

9. A computer program product, tangibly stored on computer readable medium at a controller, the controller remote from and capable of communication with a data processing center and end points in a metering system, the product including instructions to cause the controller to:
   store utility pricing data and user preference data, wherein the utility pricing and user preference data are updated upon receipt of updated utility pricing and user preference data;
   make a decision using (a) telemetry received from one or more of the end points, the telemetry including a measure of utility consumption, (b) one or more of the user preferences stored at the controller, and (c) one or more of the utility pricing data stored at the controller; and
   send a communication to a device to control consumption at one of the end points in accordance with the decision, wherein the device controls or monitors consumption of the utility at the end point.

10. The product of claim 9, further comprising instructions to:
    determine utility pricing data associated with one of the end points using utility pricing tables from one or more utility companies received at the controller.

11. The product of claim 9, wherein the instructions to control the device at the end point includes instructions to:
    control a smart thermostat.

12. The product of claim 9, further comprising instructions to cause the controller to:
    select one or more of the end points of the metering system in response to receiving a curtailment command; and
    send the curtailment command to the selected end points of the metering system.

13. The product of claim 12, wherein the instructions to cause the controller to select end points include instructions to cause the controller to:
    select one or more of the end points based on information specifying a type of utility service associated with the end point.

14. The product of claim 12, further comprising instructions to cause the controller to:
    maintain statistics of a number of end points that accepted the curtailment command and a number of end points that override the curtailment command.

15. The product of claim 12, further comprising instructions to cause the controller to:
    determine whether responses to the curtailment command are satisfactory; and
    when the responses are unsatisfactory, send another curtailment command specifying a higher level of curtailment to the selected end points that accepted the curtailment command.

16. The product of claim 9, further comprising instructions to cause the controller to:
    process a message received from the data processing center intended for two or more end points;
    generate separate messages, each of the separate messages being addressed to a respective end point in accordance with the received message; and
    send the separate messages to the respective end points.

17. A method for providing a metering system comprising:
    providing a controller remote from and capable of communication with a data processing center and end points in the metering system;
    storing utility pricing data and user preference data, wherein the utility pricing and user preference data are updated upon receipt of updated utility pricing and user preference data;
    making a decision using (a) telemetry received from one or more end points, the telemetry including a measure of utility consumption, (b) one or more of the user preferences stored at the controller, and (c) one or more of the utility pricing data stored at the controller; and sending a communication to a device to control consumption at one of the end points in accordance with the decision, wherein the device controls or monitors consumption of the utility.

18. The method of claim 17, further comprising determining utility pricing data associated with one of the end points.

19. The method of claim 17, wherein the device is a smart thermostat.

20. The method of claim 17, further comprising:
selecting end points at one of the controllers of the metering system in response to the controller receiving a curtailment command from the data processing center; and
sending the curtailment command to the selected end points of the metering system.

21. The method of claim 20, further comprising selecting an end point based on information specifying a type of utility service associated with the end point.

22. The method of claim 20, further comprising maintaining statistics of a number of end points that accepted the curtailment command and a number of end points that override the curtailment command.

23. The method of claim 20, further comprising:
determining whether the responses to the curtailment command are satisfactory; and
when the responses are unsatisfactory, sending another curtailment command specifying a higher level of curtailment to the selected end points that accepted the curtailment command.

* * * * *